United States Patent [19]

O'Gorman

[11] Patent Number: 5,461,707
[45] Date of Patent: Oct. 24, 1995

[54] METHOD OF REDUCING DOCUMENT SIZE FOR DIGITAL DISPLAY

[75] Inventor: Lawrence P. O'Gorman, Madison, N.J.

[73] Assignee: AT&T IPM Corp., Coral Gables, Fla.

[21] Appl. No.: 138,153

[22] Filed: Oct. 15, 1993

[51] Int. Cl.⁶ .................................................. G06F 15/62
[52] U.S. Cl. .................................................. 395/139
[58] Field of Search ............................ 395/140, 141, 395/139, 133; 382/47, 56; 345/127, 129

[56] References Cited

U.S. PATENT DOCUMENTS 4,412,252  10/1983  Moore et al. .................... 358/160

FOREIGN PATENT DOCUMENTS 0177640  4/1986  European Pat. Off. .

OTHER PUBLICATIONS

L. O'Gorman et al., "Subsampling Text Images", *1st Intl. Conf. on Document Analysis and Recognition*, St. Malo, France, Sep. 1991, pp. 219–227.

Primary Examiner—Phu K. Nguyen
Attorney, Agent, or Firm—Michele L. Conover

[57] ABSTRACT

A method of reducing the size of an image of a document page selected rows and columns are eliminated from an image of a document page. The image is made up of a plurality of pixels which form rows and columns. Low information areas in the image are identified. An overall percentage of size reduction of the image is determined. Up to a predetermined maximum percentage of each low information area corresponding to the overall percentage of reduction is selectively removed so that the overall formatting of the document page is maintained.

9 Claims, 2 Drawing Sheets

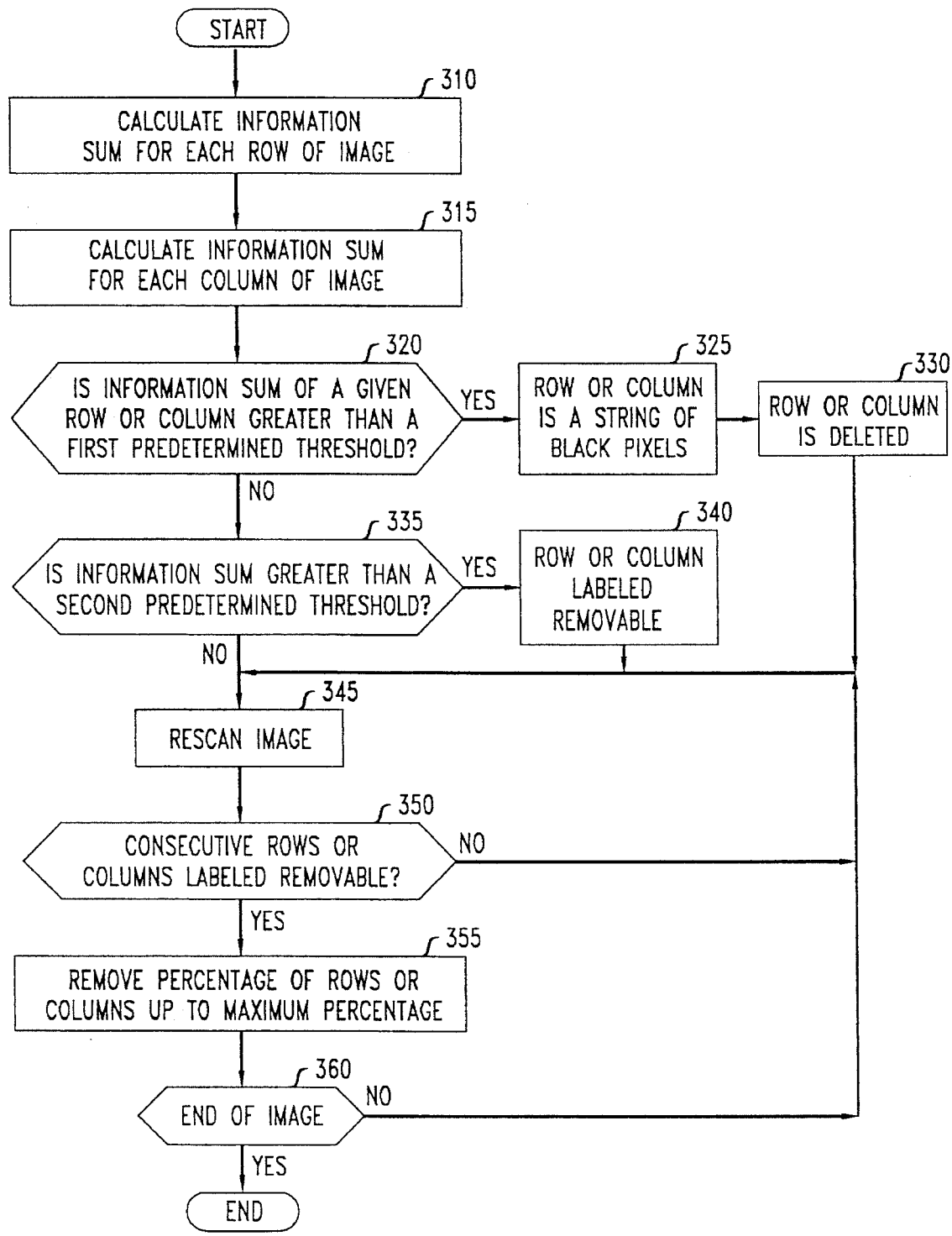

METHOD OF REDUCING DOCUMENT SIZE FOR DIGITAL DISPLAY

BACKGROUND OF THE INVENTION

The present invention is directed to a method of reducing document size for digital display and, more particularly, to a method of eliminating selected rows and columns from an image of a document page.

Electronic document systems are becoming increasingly popular for storing reference materials. Conventional electronic document systems comprise a scanner which scans an original document, digitizes each page of the document and converts it into an image comprised of picture elements, or pixels; a computer for processing the pixels and for performing any modifications to the image such as, but not limited to, size reduction; and a monitor for viewing the scanned document. The scanned documents are then stored for later retrieval.

Electronic documents can be easily retrieved from a document system's memory and viewed on a monitor. However, the amount of data contained in a standard 8.5×11 inch document page significantly exceeds the amount of data which can be viewed on a typical monitor. In particular, a standard image resolution for document scanners is 300 pixels per inch (conventionally referred to as dots per inch, or dpi). Thus, for an 8.5×11 inch document page, the scanned size is 2550×3300 pixels. The pixel dimensions of the screen of a conventional monitor are 1600×1280. Based on these measurements, it is evident that a full page cannot be completely displayed on such a monitor.

It is thus well known that if the entire document page is to be viewed on the monitor, the amount of data contained in the document page must be reduced. Indeed, one approach known in the prior art is to subsample the image in such a way as to match the pixel dimensions of the subsampled image with those of the monitor on which it is to be displayed. This approach, however, can result in a severe loss of clarity, such as edge definition, and a noticeable reduction in the size of, for example, text or other features. In the above illustration, for example, no less than 38% of the image data is lost.

In order to ameliorate this situation, the page can be processed prior to subsampling in such a way as to remove so-called low-information areas, such as areas of white space or black space. Since this will result in a certain reduction in the amount of data in the image to be subsampled, less information-bearing data is lost because the degree of subsampling required is lessened. The clarity of the page is better, and the reduction in size of the text is minimized. This technique is described more fully in L. O'Gorman, et al. "Subsampling Text Images", 1st Intl. Conf. on Document Analysis and Recognition, St. Malo, France, September, 1991, pp. 219–227.

A problem remains, however. The techniques disclosed to this point for reducing or removing the low-information areas of a page can, in many cases, distort its formatting. The term "formatting," in this context, refers to the apparent spatial and/or geometrical relationships among the major pictorial elements of the page, e.g., blocks of text, the lines of text within a block, tables and figures, columns of white space between blocks, headers, etc.—that is, the particular visual appearance of the overall page.

SUMMARY OF THE INVENTION

In accordance with the present invention, this problem is overcome by limiting the fraction of any particular low-information area that is removed from a page to be no greater than the fraction by which the overall page is to be reduced.

In preferred embodiments, the low information areas of a page are identified by first determining a row (column) priority value for each pixel in the page image based on a comparison of each pixel to pixels in neighboring positions in the immediately adjacent rows (columns). An information sum is calculated for each row (column) by summing up the row (column) priority values for each pixel in the row (column). The low information areas of the image are defined as being those comprising a group of adjacent rows (columns) having information sums which are less than a predetermined threshold.

BRIEF DESCRIPTION OF THE DRAWING

FIG. 3 is a flow chart depicting a method of subcompacting a scanned document page in accordance with the principles of the invention.

DETAILED DESCRIPTION

Figure 1:
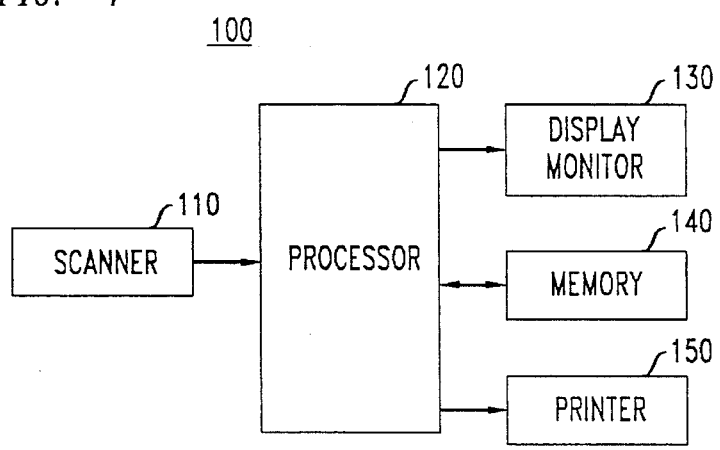
FIG. 1 is a block diagram of an electronic document system embodying the principles of the present invention.

Referring to FIG. 1, there is shown an electronic document system 100 for implementing a method of reducing the image size of a document page in accordance with the present invention. An original document (not shown) is scanned by a scanner 110 which converts the document to digital image signals. The document is illustratively comprised primarily of alphanumeric text. The digital image signals are applied to a processor 120 which processes the signals for a display 130, illustratively, a monitor. The processor 120 can be any type of computer system such as a personal computer or computer workstation.

The processor 120 is capable of identifying rows or columns of the document page that are low information areas and adaptively removing up to a maximum percentage of the low information areas in accordance with an overall percentage of reduction established for the page. The document page can then be displayed on the display 130 and stored in memory 140 for future use. A printer 150 may also be associated with the processor 120 for receiving the data transmitted by the scanner 110.

Figure 2A:
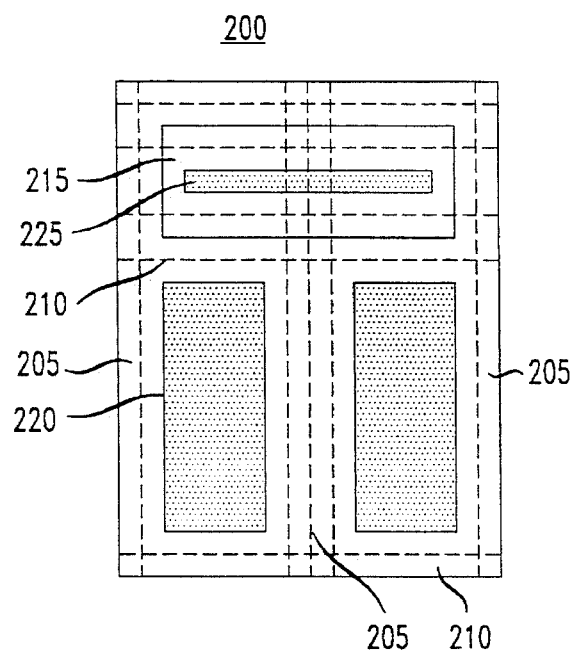
FIGS. 2a and 2b illustrate a document page subjected to the reduction technique implemented by the system of FIG. 1.
Figure 2B:
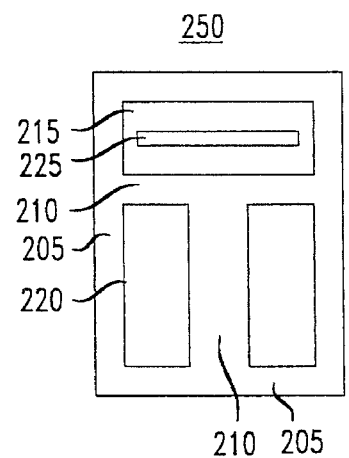

The method of removing low information data from the document image is designed to maintain the formatting of the original page. For example, FIGS. 2a and 2b illustrate an exemplary document page 200 which has been reduced in size in accordance with the present invention. The page 200 comprises two text blocks 220 which are bordered by low information data in the form of excess white space located in border columns 205 and border rows 210. A title block 225 and frame 215 are located above the text blocks 220. The frame 215, like the excess white space, is considered to be low information data and can be subjected to a greater amount of data reduction than portions of the page on which the text blocks 220 or title block 225 are located.

In order to reduce the size of the page, a percentage of the document data must be removed. A first consideration in removing document data is that the formatting of the page be maintained. A second consideration is that the clarity of the information-bearing data be preserved.

It is desirable to preserve the apparent spatial relationships and layout of the title block 225, text blocks 220, border columns 205 and border rows 210 of the page 200 to maintain a similar aesthetic appearance in an image page 250 of reduced size. Reductions in data which eliminate too much low information data may cause the text blocks 220 to merge together, or change the overall aesthetic appearance of the image page.

The document page 200 is scanned to identify areas comprising low information data. In addition, a percentage of desired overall reduction in document size is determined. In accordance with the invention, the amount of low information data from each of the various low-information areas is reduced by up to the percentage of reduction established for the entire page.

For example, if the overall percentage of reduction for the page 200 is 40% and the border column 205, i.e., a low information area, comprises three low information lines, one of the three low information lines or 33% may be removed. If a second low information line of the border column 205 were to be removed, a reduction of 66% of the low information lines in that area would occur which would exceed the percentage of reduction established for the page. Such a reduction in any particular low information area is sought to be avoided.

A similar analysis is performed for each low information area identified on the page 200. By reducing the low information data in this manner, the formatting of the page 200 is generally preserved as illustrated in FIG. 2b, and the initial reduction of data contained within the page 200 is concentrated on the low information data. Typically, the overall reduction in data caused by reducing the low information data is between 5% and 40%. A conventional subsampling method can then be used to produce the desired overall reduction in data and ultimately document size.

Referring to FIG. 3, there is shown a flow chart depicting a method of reducing the image size of a document page within a predetermined threshold. The predetermined threshold represents the percentage of overall size reduction of the image which can occur and is preferably in the range of 5–50%. The percentage of size reduction is preferably adaptive so that a desired degree of page formatting is maintained. The term "adaptive" refers to the ability to reduce different sections of the document data by different percentages provided that the percentage of reduction for any particular area does not exceed the percentage of reduction established for the overall page. The size reduction is accomplished by reducing low information areas in the rows and columns of the image page. The low information areas include illustratively, but are not limited to, blank margins and spaces between lines. It is to be realized that, if these low information areas are haphazardly removed, the formatting of the page will not be maintained. Other areas subject to significant image reduction include noisy regions such as, illustratively, graphics features which may include border lines or table borders.

In order to identify the low information areas of a given image page, an information sum for each row (column) in the page is calculated (step 310). The information sum represents the abundance of information-bearing data or text features contained within a given row (column) and can be used to prioritize the importance of maintaining the given row (column). The information sum is calculated by using, illustratively, a 1×3 mask. This mask is used for measuring row information in which the pixel being examined is the middle pixel $X0$ and the pixels $X1$ and $X2$ represent pixels in the same position as $X0$ in adjacent rows on either side of $X0$ as illustrated below:

| X1 |
| X0 |
| X2 |

The value for each pixel in the mask is a binary value, i.e., either a 1 or a 0. A pixel having a value of 1 indicates an ON or black pixel, and a pixel having a value of 0 indicates an OFF or white pixel. Likewise, an information sum for each column is calculated by using, illustratively, a 3×1 mask (step 315). This mask is used for measuring column information in which the middle pixel $X0$ is examined and the pixels $X1$ and $X2$ represent pixels in the same position as $X0$ in adjacent columns on either side of $X0$ as illustrated below:

| X1 | X0 | X2 |

The following table indicates the priority of the information contained within a given row (column) based on the value of the mask:

| X1, X0, X2 | Priority | Reason |
| --- | --- | --- |
| 010 | 10 | very important to maintain disconnectivity |
| 101 | 10 | same as above |
| 011 | 5 | important to maintain an edge |
| 110 | 5 | same as above |
| 111 | 2 | somewhat important to maintain shape |
| 001 | 1 | only important if adjacent row(s) deleted |
| 100 | 1 | same as above |
| 000 | 0 | not important |

When pixels $X1$, $X0$ and $X2$ have the values 010 or 101, a high priority value (10) is assigned to pixel $X0$ to maintain disconnectivity. Disconnectivity refers to the separation between distinct edges within the text such as, illustratively, spaces between different characters or maintaining contrast within the same character as in the letter "O". If pixel $X0$ is deleted, the remaining pixels would be 00 or 11 and would no longer include the contrasting pixel which provides separation between pixels $X1$ and $X2$. As a result, characters in the text may become distorted by either merging into adjacent characters or by losing distinctive features such as holes or curves as in the characters "o" or "g".

When pixels $X1$, $X0$ and $X2$ have the values 011 or 110, a medium priority (5) is assigned to indicate that the inclusion of $X0$ is important to maintain the edge of a character. If the row containing pixel $X0$ is deleted, the edge of the character may become distorted.

When pixels $X1$, $X0$ and $X2$ have the value 111, a priority value of 2 is assigned to pixel $X0$. While the deletion of pixel $X0$ could result in a loss of shape, it is unlikely that the loss will severely distort the shape of the character and therefore less importance is placed on maintaining the pixel.

When pixels $X1$, $X0$ and $X2$ have the values 001 and 100, a priority value of 1 is assigned to pixel $X0$. The deletion of the row containing pixel $X0$ causes a decrease in white space but does not cause a loss in connectivity since one of the adjacent pixels also has a value of zero. However, if the adjacent pixel having a value of zero is also deleted, then the presence of $X0$ is important to maintain connectivity.

When pixels $X1$, $X0$ and $X2$ have the value 000, a priority of 0 is assigned to pixel $X0$. Since all three pixels represent white space, the deletion of the row containing pixel $X0$ will simply decrease the amount of white space and not cause any distortion of the text.

The information sum for each row (column) is determined by obtaining a priority value for each pixel in the row (column) and adding the priority values together. If the information sum is greater than a first predetermined threshold (step 320), the black pixels are determined to be black background information as opposed to text foreground information, i.e., white text on a black background or a black border frame (step 325). As such, the length of the run of black pixels multiplied by the information measure of the black background is subtracted from the information sum, i.e., the row (column) is deleted (step 330).

The first predetermined threshold is based on a minimum length of a run of black or ON (1) pixels along a row (column). A row (column) of ON pixels which exceeds this first threshold is deemed to be background information and can be more significantly reduced than regular text information. Typically the first predetermined threshold is preferably at least 100 consecutive ON pixels.

If the information sum of a row (column) is above a second predetermined threshold, the row (column) is identified as containing too much information for the row (column) to be deleted from the image (step 335). If the information sum of the row (column) falls below the second predetermined threshold, the row (column) is labelled as being "removable" (step 340). Typically, the second predetermined threshold is preferably at least 60 ON pixels.

Once the information sums have been calculated for the entire image, these sums are examined in raster order to determine how many rows and columns can be removed without destroying the formatting of the document (step 345). The number of consecutive rows and columns labelled "removable" are noted (step 350), and a number is chosen as the maximum percentage of rows which can be removed from the consecutive rows (columns) (step 355). For example, if a maximum reduction of 40% is permissible and the number of consecutive low information lines is four, then only one low information line can be removed or 25% of the consecutive low information lines. If two of the four low information lines were removed, a reduction of 50% would occur which is greater than the maximum amount of reduction allowed.

In determining which of the rows (columns) are to be deleted, the rows (columns) having the lowest information sum are identified and removed. An analogous process is performed for each low information area. Once each row and column has been scanned and each possible row and column has been removed, the reduction procedure is complete (step 360). As discussed above, subsampling techniques may be applied to the document to achieve the overall desired size reduction.

The foregoing merely illustrates the principles of the invention and it will thus be appreciated that those skilled in the art will be able to devise numerous alternative arrangements which, although not explicitly described herein, embody the principles of the invention and are within its scope and spirit.

I claim:

1. A method of reducing the size of an image of a document page by an overall percentage of reduction, said image comprising a plurality of pixels which form rows and columns, said method comprising the steps of:

identifying low information areas in said image; and selectively removing a fraction of each low information area which is no greater than said overall percentage of reduction.

2. The method of claim 1 wherein said identifying step further comprises:

calculating an information sum for each row of pixels within the image based on priority values assigned to each pixel in the row, calculating an information sum for each column of pixels within the image based on priority values assigned to each pixel in the column, identifying a row or column having an information sum which exceeds a first predetermined threshold value as a low information line;

identifying a row or column having an information sum which falls below a second predetermined threshold as a low information line; and identifying each group of adjacent low information lines as a low information area.

3. The method according to claim 2 wherein said priority value for a first pixel within a given row is based on the status of said first pixel within the row and pixels located in corresponding positions in rows on respective sides of said given row.

4. The method according to claim 2 wherein said priority value for a first pixel within a given column is based on the status of said first pixel within the column and pixels located in corresponding positions in columns on respective sides of said given column.

5. The method according to claim 3 wherein said first predetermined threshold value indicates the number of consecutive pixels having a high priority value in said given row.

6. The method according to claim 4 wherein said first predetermined threshold value indicates the number of consecutive pixels having a high priority value in said given column.

7. The method according to claim 6 wherein said first predetermined threshold value is at least 100 consecutive pixels having a high priority value.

8. The method according to claim 2 wherein the second threshold value is a sum of priority values of approximately 60 pixels having a high priority value.

9. A method of reducing the image size of a scanned document page comprised of a plurality of pixels, each pixel being assigned a priority value, the method comprising:

calculating an information sum for each row and column of the image based on the sum of the priority values of the pixels in each row and column, identifying blocks of at least two adjacent rows or columns having information sums which fall below a predetermined threshold value, removing a number of the adjacent rows or columns by an amount which is less than or equal to a percentage of size reduction for the overall image.

* * * * *